(12) United States Patent
Bjekovic et al.

(10) Patent No.: US 9,914,489 B2
(45) Date of Patent: Mar. 13, 2018

(54) UNDERBODY STIFFENING AND COVERING MODULE

(71) Applicant: Daimler AG, Stuttgart (DE)

(72) Inventors: Robert Bjekovic, Ehningen (DE); Asmir Salkic, Ulm (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/105,402

(22) PCT Filed: Dec. 5, 2014

(86) PCT No.: PCT/EP2014/003267
§ 371 (c)(1),
(2) Date: Jun. 16, 2016

(87) PCT Pub. No.: WO2015/090526
PCT Pub. Date: Jun. 25, 2015

(65) Prior Publication Data
US 2016/0318555 A1    Nov. 3, 2016

(30) Foreign Application Priority Data

Dec. 18, 2013 (DE) .................. 10 2013 021 403

(51) Int. Cl.
*B60K 37/00* (2006.01)
*B62D 25/20* (2006.01)
(Continued)

(52) U.S. Cl.
CPC .......... *B62D 25/20* (2013.01); *B60R 13/0861* (2013.01); *B62D 29/041* (2013.01);
(Continued)

(58) Field of Classification Search
None
See application file for complete search history.

(56) References Cited

U.S. PATENT DOCUMENTS 1,483,650 A * 2/1924 Elbert, Jr. .............. B62D 25/00
296/181.4
1,591,215 A * 7/1926 Jacobs .................. B62D 21/06
280/794
(Continued)

FOREIGN PATENT DOCUMENTS

CN           1165505 A     11/1997
CN         202368683 U      8/2012
(Continued)

OTHER PUBLICATIONS

International Search Report (PCT/ISA/210) issued in PCT Application No. PCT/EP2014/003267 dated Feb. 6, 2015 with English translation (Four (4) pages).
(Continued)

*Primary Examiner* — Kiran B Patel
(74) *Attorney, Agent, or Firm* — Crowell & Moring LLP

(57) ABSTRACT

An underbody stiffening and covering module is provided, which has a flat, non-load-bearing covering component made from a plastic material. At least one reinforcing strut is connected firmly to the covering component, the reinforcing strut extends along a predetermined load path and has a respective connection device on its end sections, with which, together with the covering component, is able to be connected to a predetermined underbody section at force application points.

8 Claims, 1 Drawing Sheet

(51) Int. Cl.
 *B62D 29/04* (2006.01)
 *B62D 35/02* (2006.01)
 *B60R 13/08* (2006.01)
(52) U.S. Cl.
 CPC ........... *B62D 29/043* (2013.01); *B62D 35/02* (2013.01); *Y02T 10/88* (2013.01)

(56) References Cited

U.S. PATENT DOCUMENTS

| | | | | | |
|---|---|---|---|---|---|
| 2,080,748 | A | * | 5/1937 | Slack | B62D 21/06 280/793 |
| 2,139,788 | A | * | 12/1938 | Woolson | E04C 3/083 280/794 |
| 2,163,694 | A | * | 6/1939 | Matthews | B62D 21/06 280/794 |
| 2,173,516 | A | * | 9/1939 | Eklundar | B62D 21/06 280/794 |
| 2,177,991 | A | * | 10/1939 | Maddock | B62D 21/06 280/794 |
| 2,229,371 | A | * | 1/1941 | Chayne | B62D 21/06 280/783 |
| 2,314,603 | A | * | 3/1943 | Sorensen | B62D 21/06 280/794 |
| 2,476,664 | A | * | 7/1949 | Humig | B60G 9/02 267/286 |
| 2,676,030 | A | * | 4/1954 | Sherman | B60G 11/14 280/794 |
| 2,715,041 | A | * | 8/1955 | Fierbaugh | B60G 99/002 267/228 |
| 2,739,822 | A | * | 3/1956 | Schilberg | B62D 21/06 280/794 |
| 2,747,887 | A | * | 5/1956 | Schilberg | B62D 21/06 280/794 |
| 2,835,506 | A | * | 5/1958 | Schilberg | B62D 21/06 280/794 |
| 3,415,568 | A | * | 12/1968 | Gugelot-Chuard | B62D 29/046 296/181.2 |
| 3,419,303 | A | * | 12/1968 | Eggert, Jr. | B62D 21/10 296/204 |
| 4,198,454 | A | * | 4/1980 | Norton | B32B 3/12 102/303 |
| 4,211,044 | A | * | 7/1980 | Gugliotta | E04B 1/19 52/200 |
| 4,898,419 | A | * | 2/1990 | Kenmochi | B62D 21/10 296/191 |
| 5,332,290 | A | * | 7/1994 | Borlinghaus | A62B 35/04 280/806 |
| 5,435,226 | A | * | 7/1995 | McQuilkin | F41H 5/0464 428/117 |
| 5,448,938 | A | * | 9/1995 | Fernandez | B60N 2/6009 109/49.5 |
| 5,704,644 | A | * | 1/1998 | Jaggi | B60K 1/00 180/311 |
| 5,729,463 | A | * | 3/1998 | Koenig | B23K 11/11 700/98 |
| 5,772,276 | A | * | 6/1998 | Fetz | B62D 25/2054 296/181.2 |
| 5,979,684 | A | | 11/1999 | Ohnishi et al. | |
| 5,979,962 | A | * | 11/1999 | Valentin | B60R 13/01 296/37.1 |
| 6,145,907 | A | * | 11/2000 | Maruyama | B62D 43/10 296/37.14 |
| 6,378,933 | B1 | * | 4/2002 | Schoen | B62D 29/002 296/187.02 |
| 6,854,791 | B1 | * | 2/2005 | Jaggi | B62D 29/041 296/203.01 |
| 7,087,296 | B2 | * | 8/2006 | Porter | B29C 66/721 428/223 |
| 7,287,797 | B1 | * | 10/2007 | Belloso | B62D 21/03 296/181.2 |
| 9,662,855 | B2 | * | 5/2017 | Pfaffelhuber | B32B 3/26 |
| 2006/0003044 | A1 | * | 1/2006 | DiNello | B29C 41/18 425/412 |
| 2007/0114816 | A1 | | 5/2007 | Hoelzel et al. | |
| 2008/0179913 | A1 | * | 7/2008 | Coon | E05D 5/02 296/146.11 |
| 2010/0117394 | A1 | * | 5/2010 | Teli | B60N 2/3075 296/69 |
| 2013/0175829 | A1 | * | 7/2013 | Kim | B60K 1/04 296/204 |
| 2013/0214558 | A1 | * | 8/2013 | Lohmann | B62D 25/025 296/187.08 |
| 2013/0249249 | A1 | | 9/2013 | Andree et al. | |
| 2013/0300158 | A1 | | 11/2013 | Andree et al. | |
| 2014/0021747 | A1 | * | 1/2014 | Goettker | B29C 70/48 296/203.01 |
| 2014/0070562 | A1 | | 3/2014 | Inagaki | |
| 2014/0300126 | A1 | * | 10/2014 | Ehrlich | B62D 27/02 296/29 |
| 2014/0318357 | A1 | * | 10/2014 | Parida | F41H 5/02 89/36.02 |
| 2014/0327268 | A1 | * | 11/2014 | Mori | B62D 21/157 296/187.08 |
| 2015/0102639 | A1 | * | 4/2015 | Yoshioka | B62D 27/023 296/192 |
| 2016/0059451 | A1 | * | 3/2016 | Rousseau | B29C 43/203 264/45.6 |
| 2016/0156080 | A1 | * | 6/2016 | Enning | H01M 2/1077 429/83 |
| 2017/0058175 | A1 | * | 3/2017 | Gasworth | C09K 5/063 |
| 2017/0101132 | A1 | * | 4/2017 | Chung | B62D 21/15 |

FOREIGN PATENT DOCUMENTS

| | | |
|---|---|---|
| CN | 203078611 U | 7/2013 |
| CN | 103415416 A | 11/2013 |
| DE | 195 21 632 A1 | 12/1996 |
| DE | 196 08 127 A1 | 9/1997 |
| DE | 10 2006 054 002 A1 | 5/2008 |
| DE | 10 2007 002 209 A1 | 7/2008 |
| DE | 10 2008 056 146 A1 | 5/2010 |
| DE | 10 2010 014 515 A1 | 11/2010 |
| DE | 10 2010 014 517 A1 | 11/2010 |
| DE | 10 2010 053 346 A1 | 6/2012 |
| DE | 10 2011 009 442 A1 | 7/2012 |
| EP | 1 340 669 A2 | 9/2003 |

OTHER PUBLICATIONS

German-language Written Opinion (PCT/ISA/237) issued in PCT Application No. PCT/EP2014/003267 dated Feb. 6, 2015 (Five (5) pages).

Chinese-language Office Action issued in counterpart Chinese Application No. 201480069182.6 dated May 3, 2017 with English translation (10 pages).

\* cited by examiner

UNDERBODY STIFFENING AND COVERING MODULE

BACKGROUND AND SUMMARY OF THE INVENTION

The invention relates to an underbody stiffening and covering module as well as a motor vehicle underbody.

Reinforcing struts are often installed diagonally on the underbody in motor vehicle bodies in order to reduce twisting during the driving operation, in particular for convertibles, the body stiffness of which is reduced as a consequence of the lack of roof. It is also possible to use struts where an increased tendency for vibration is to be expected. Additional stiffness is thereby targetedly obtained and the individual frequency of the respective body region is increased such that the vibrations take place in a frequency band which is not felt to be disruptive. This relates in particular to regions of the body in which forces and/or torques are applied, so approximately in the region of the storage of the motor/gearbox unit as well as in the region of the wheel drives and/or suspension.

DE 10 2011 009 442 A1 and DE 10 2010 053 346 A1 disclose a motor vehicle underbody reinforced with a diagonal strut device. The diagonal strut device has a number of struts made from a fiber-reinforced material which extend away from a central node, wherein the struts can each be connected to the underbody at their free end via a connection node element which consists of a light metal. The connection node elements can each be connected to the end of the struts positively or via a firm cast connection.

The motor vehicle underbody is frequently clad in order to prevent moisture and dirt influence on the chassis parts and the struts referred to. The underbody covering consists of flat covering parts which each cover a part of the underbody. During the vehicle assembly, the covering parts can only be assembled if chassis parts and reinforcing struts are assembled completely.

Such a covering part is described by DE 195 21 632 A1. This is an injection molded part having comparably thin wall thickness which is produced from an elastic material and is connected to reinforcing struts, which are present on the underbody, on the edge side via screw connections. To connect the covering part to the struts, retaining clips are used which are to prevent the comparably flexible and flat component from sagging.

In order to avoid vibrations and rubbing on the underbody and the struts attached thereto, the underbody covering, with the exception of the fastening or screw-on points, must be attached at a distance to the underbody and to the struts. Important construction space is hereby lost.

Based on this prior art, the object of the present invention is to create an underbody stiffening and covering module with which it is possible, during motor vehicle production, to both stiffen and clad an underbody more quickly and using less assembly material, and to use less construction space.

The underbody stiffening and covering module according to the invention has a flat, non-load-bearing covering component made from a plastic material, to which one or more reinforcing strut(s) is/are connected. The reinforcing strut(s) extends/extend respectively along a predetermined load path and each have a connection device on their end sections, with which it or they, together with the covering component, is or are able to be connected to a predetermined underbody section at force application points.

Firm connections in the sense of the invention are connections in the case of which the connection partners are held together by atomic or molecular forces. They are, at the same time, non-releasable connections which can only be separated by destruction of the connection means.

The reinforcing struts do not serve primarily for the stiffening of the covering component, but rather for the stiffening of a motor vehicle body on the underbody in order to obtain a certain torsional stiffness. The underbody stiffening and covering module according to the invention now combines, however, two functions, in particular the function of the reinforcing struts and the function of the underbody cover, whereby the assembly of a reinforced and clad motor vehicle underbody can be clearly accelerated on the production line and connection means can be saved, since the covering component and the force-conducting reinforcing struts can be attached using the same connection means, for example screws. Furthermore, construction space is saved. The underbody covering must now no longer additionally be at a distance to the reinforcing strut, since the reinforcing strut already represents a part of the underbody covering.

The covering component, or its flat regions, only has to have low mechanical loading capability, since it does not have to transfer any further operational forces apart from the aerodynamic forces and possible forces on contact with obstacles in the road. It can therefore be designed to have very thin walls, for example as a resistant "plastic skin." The load path is determined based on certain stiffness boundary conditions for the respective underbody to be reinforced; the same load paths as have previously already been reinforced with struts on an existing underbody can also be used. The struts can be both tension struts and pressure struts, wherein the strut cross-section can be optimized with regard to the respective loading type to be expected in order to obtain higher security against buckling.

In a further embodiment, the covering component can have two or more layers between which the reinforcing strut is embedded. The layers abut onto each other in a contract region in which the reinforcing strut is not present, and are firmly connected.

One of the layers is an aurally active layer, for example a layer having a predetermined porosity or having chambers of a predetermined size, which is dimensioned for damping certain frequencies. This layer can be embedded particularly advantageously between two loadable layers which protect the aurally active layer. The aurally active layer is preferably formed from a polymer foam. The foam material can be divided into several chambers. A sandwich structure hereby advantageously results having a core layer made from damping material and/or a reinforcing strut and cover layers, or outer layers, made from loadable plastic. The outer layers can here be designed to have very thin walls, wherein this can be, for example, a loadable plastic film. The aurally active layer here does not have to be fully present between the two "cover layers," but can also only be arranged locally therebetween in order to achieve improved noise damping locally.

According to a further embodiment, the underbody stiffening and covering module can have at least a further reinforcing strut which extends along a further predetermined load path. The reinforcing strut and the further reinforcing strut can intersect and be connected to each other at the intersection point.

According to the invention, an advantageous embodiment of the invention has more than two struts, which can extend virtually in the manner of a network or a spider web through the underbody stiffening and covering module. The underbody of a motor vehicle body can hereby be targetedly stiffened in several directions, whereby the struts can have an adapted cross-section depending on the forces to be transferred via the respective load path. The assembly of such underbody stiffening and covering modules which are "stiffened multiple times" is not connected to increased expenditure, but rather the assembly course corresponds substantially to the attachment of a usual underbody cover. The underbody covering module can here be flat or even arched or bent. Preferably the bend points of the underbody covering module are present at the ends or the edges of the reinforcing struts such that the reinforcing struts themselves run in a straight line without bend points.

Additionally, the covering component can have one or more channel(s) for embedding the reinforcing strut, into which the reinforcing strut(s) is/are inserted, wherein the cross-section of the channel(s) corresponds advantageously to the cross-section of the reinforcing strut(s) and the reinforcing strut is connected firmly to the channel.

Advantageously, the covering component can be composed of two half-shells, of which each has a channel, which are arranged opposite each other and which together virtually form a "receiving channel" for the reinforcing struts. The reinforcing struts can, with these half-shells, for example, be cast with a plastic casting compound or a glue, whereby the penetration of moisture/dirt into the reinforcing strut can also then be prevented if one of the layers or a half-shell, for example, is damaged by contact with a foreign body.

Finally, the connection device to the underbody can be a bore which extends through the reinforcing strut and the covering component. Alternatively or additionally, the reinforcing strut can have a hollow cross-section. The reinforcing strut can have a circular, rectangular, elliptical or polygonal cross-section. Preferably, the reinforcing strut consists of a fiber-reinforced plastic (FRP), in particular of a carbon fiber-reinforced plastic (CRP).

The bore advantageously extends through all layers of the covering component and through the reinforcing strut itself such that a screw or another connection means can be inserted through. In an advantageous embodiment, the hollow cross-section of the strut can also be filled with an aurally active material, for example can be foamed. In one embodiment, a socket made from an elastomer can be set into the bore in order to achieve, similarly to chassis parts, a flexible connection of the reinforcing strut to the underbody.

A preferred production method for the underbody stiffening and covering module includes the following steps: (a) providing the flat covering component and the at least one reinforcing strut, and (b) positioning the at least one reinforcing strut on the flat covering component at least along the predetermined load path and firmly connecting the reinforcing strut to the flat covering component.

In another embodiment, the following can be executed: in step (a), providing the at least two layers, and in step (b), insertion of the reinforcing strut into the channel of one of the layers, then arranging the other layer on top.

In step (b), a thermoforming step can furthermore be executed in order to connect the reinforcing strut firmly to the covering component. Thermoforming is known from the production of covering parts, wherein a thermoforming system can be modified with low expenditure for the production of the underbody stiffening and covering module according to the invention. The reinforcing strut(s), together with the layer(s) of the covering component, are, for this purpose, inserted into the latter before closing the molding tool, wherein the covering component or the layers of the covering component melt with the reinforcing strut(s) due to heat influence, or a melt adhesive can be used.

The motor vehicle underbody according to the invention has a covering which is connected to an underbody section and has one or more reinforcing strut(s), wherein the covering and the reinforcing strut(s) are provided by an underbody stiffening and covering module according to the invention, wherein the underbody covering part and the reinforcing strut of the underbody stiffening and covering module are connected to common force application points of the underbody section. The load path or the load paths along which the reinforcing strut(s) run here connect the force application points such that the underbody section is stiffened between the force application points. In order to achieve a comprehensive and multi-axis stiffening, an underbody stiffening and covering module is advantageously used having a plurality of reinforcing struts on different load paths. In the case of the underbody according to the invention, defective reinforcing struts and/or connection devices can be exchanged more easily than before, since the covering does not have to be removed first, but rather the respective reinforcing struts can be removed and exchanged as one unit together with the covering component.

For the assembly of the motor vehicle underbody according to the invention, at least the following steps are executed: (a) providing the underbody section and the underbody stiffening and covering module, (b) positioning the underbody stiffening and covering module on the underbody section such that the connection devices of the reinforcing strut of the underbody stiffening and covering module lie over the force application points of the underbody section, and (c) connecting the connection devices of the underbody stiffening and covering module to the force application points of the underbody section, simultaneously thereby fastening the non-load-bearing flat covering component and reinforcing strut to the underbody section.

The advantage which is achieved by using the underbody stiffening and covering module according to the invention is that, to attach the covering and the reinforcing struts, only one step must be executed and here only one set of connection means, for example screws, are used. The assembly can therefore occur more quickly, which can clearly lower the production costs of a motor vehicle which has an underbody according to the invention.

These and further advantages are set out by the description below with regard to the enclosed figures. The reference to the figures in the description serves for the facilitated understanding of the subject matter. The figures are only a schematic depiction of one embodiment of the invention.

DETAILED DESCRIPTION OF THE DRAWINGS

Figure 1:
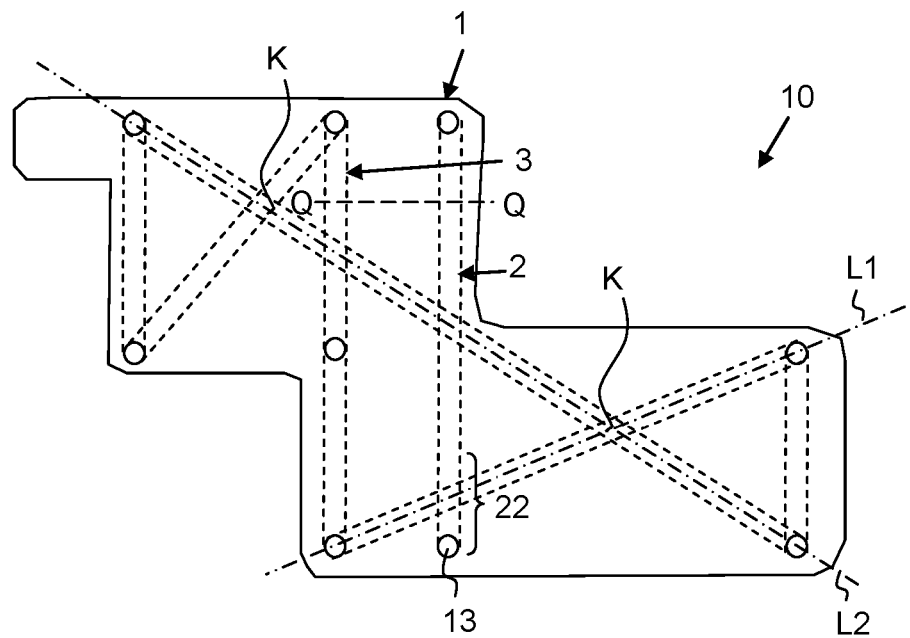
FIG. 1 is a top view onto the underbody stiffening and covering module.

FIG. 1 depicts the underbody stiffening and covering module 10 according to the invention in a top view; it has several reinforcing struts 2, 3. The reinforcing struts 2, 3 are firmly connected to the covering component 1 according to their length and each have a bore 21 on their ends 22, 23 (see also FIG. 2), which is arranged to fit over a bore 13 of the covering component 1 respectively, wherein the bores 13, 21 together form the connection device which is to be connected to a force application point of the underbody. Some of the reinforcing struts 2,3 intersect at the points K, wherein they can be connected to each other at the points K or not, if a mutual repositioning ability is desired. A screw or a similar connection means is guided through the bores 13 of the underbody stiffening and covering module 10 respectively, with which connection means it is screwed to the underbody such that operating forces can be transferred via the reinforcing struts 2, 3 during the driving operation.

The covering component 1 here fulfills no load-bearing function, but principally a cover function, similar to known underbody coverings. The reinforcing struts 2, 3 are, for this purpose, provided to be force-conducting, and are to be attached to force application points of a motor vehicle underbody in order to stiffen a motor vehicle body. Besides the stiffening of the motor vehicle body, a fastening of the covering component 1 to be secure against sagging is also achieved by the struts, the covering component being able to consist, for example, of a thin-walled plastic plate. Furthermore, the reinforcing struts also cause a high stiffening of the covering component with improved NVH properties (Noise Vibration Harshness). The covering component can also be designed to be thinner than usual coverings. The reinforcing struts 2, 3 each follow a predetermined load path L1, L2, the course of which can be determined depending on stiffness boundary conditions for the respective underbody to be stiffened. The assembly of a motor vehicle underbody which has a covering and a reinforcement can occur more quickly than before using the underbody stiffening and covering module 10 according to the invention, since both the reinforcement and the covering are assembled in one step, wherein the same force application points are used.

Figure 2:
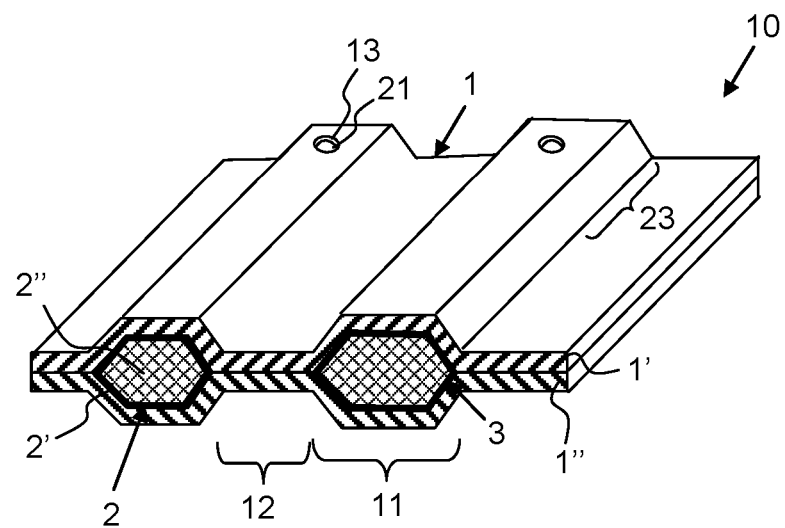
FIG. 2 is a partial cross-section of the underbody stiffening and covering module.

A cross-section of a part of the underbody stiffening and covering module 10 is depicted in FIG. 2, wherein the cross-sectional plane is the plane Q-Q shown in FIG. 1. The part of the underbody stiffening and covering module 10 which is adjacent, on the left of the figure, to the reinforcing strut 2 to the left in the figure is hereby not shown. The covering component 1 has an upper 1' and a lower layer 1" which each have, opposite each other, a channel 11, which corresponds to the cross-section of the struts 2, 3, wherein the reinforcing struts 2, 3 are introduced into the "receiving channel" formed by the channels 11 respectively and are connected firmly to this. The reinforcing struts 2, 3 here have a hollow cross-section, wherein the hollow profile 2' is filled with a foam 2". The layers 1', 1 abut onto each other in a contact region 12 which extends where the channels 11 are not present, and are connected firmly. The reinforcing struts 2, 3 are here dimensioned such that they can receive the forces arising on the underbody during the driving operation of a motor vehicle and contribute to a reinforcement of the motor vehicle body. The forces are led from the underbody respectively via the connection devices through the reinforcing struts 2, 3, wherein the connection devices are here each formed by a bore 13, 21 present in the end section 23 of the reinforcing strut 2, 3, the bore extending through the layers 1', 1" and the respective reinforcing strut 2, 3 itself.

The invention claimed is:

1. An underbody stiffening and covering module comprising:
    a covering component made from plastic material,
    at least one reinforcing strut extending along the covering component relative to a predetermined load path and the at least one reinforcing strut having a connection on respective end sections, the at least one reinforcing strut together with the covering component being connectable to a predetermined underbody section at one or more force application points,
    wherein the at least one reinforcing strut is connected to the covering component,
    wherein the covering component has at least two layers, and the at least one reinforcing strut is embedded between the at least two layers of the covering component, and
    wherein one of the at least two layers of the covering component is an aurally active layer having a predetermined porosity or having chambers of a predetermined size which are dimensioned for damping certain frequencies.

2. The underbody stiffening and covering module according to the claim 1, wherein the at least two layers further includes two loadable layers and the aural active layer is embedded between the two loadable layers.

3. The underbody stiffening and covering module according to claim 1, further comprising at least one further reinforcing strut extending along the covering component relative to a further predetermined load path, wherein the at least one reinforcing strut and the at least one further reinforcing strut intersect at an intersection point.

4. The underbody stiffening and covering module according to claim 2, wherein to embed the reinforcing strut, the covering component via the at least two layers has at least one channel into which the at least one reinforcing strut is inserted, and a cross-section of the at least one channel corresponds to a cross-section of the at least one reinforcing strut.

5. The underbody stiffening and covering module according to claim 1, wherein the connection is a bore extending through the at least one reinforcing strut and the covering component.

6. The underbody stiffening and covering module according to claim 3, wherein the at least one reinforcing strut and the at least one further reinforcing strut are connected to each other at the intersection point.

7. The underbody stiffening and covering module according to claim 1, wherein the at least one reinforcing strut consists of a fiber-reinforced plastic (FRP) or a carbon fiber-reinforced plastic (CRP).

8. The underbody stiffening and covering module according to claim 1, wherein a layer of the at least two layers that faces towards the underbody consists of aural damping material.

* * * * *